(12) United States Patent
Cao et al.

(10) Patent No.: US 12,364,216 B2
(45) Date of Patent: Jul. 22, 2025

(54) CIRCULAR SPRINKLER IRRIGATION ALL-IN-ONE MACHINE CAPABLE OF SPRAYING WATER, FERTILIZER AND PESTICIDE

(71) Applicant: Institute of Farmland Irrigation, Chinese Academy of Agricultural Sciences(CAAS), Xinxiang (CN)

(72) Inventors: Hua Cao, Xinxiang (CN); Yongshen Fan, Xinxiang (CN); Chunya Ma, Xinxiang (CN); Peng Li, Xinxiang (CN); Zhen Chen, Xinxiang (CN); Fuyi Duan, Xinxiang (CN); Wei Zhan, Xinxiang (CN); Yinbo Cao, Xinxiang (CN)

(73) Assignee: Institute of Farmland Irrigation, Chinese Academy of Agricultural Sciences(CAAS), Xinxiang (CN)

( * ) Notice: Subject to any disclaimer, the term of this patent is extended or adjusted under 35 U.S.C. 154(b) by 0 days.

(21) Appl. No.: 19/035,920

(22) Filed: Jan. 24, 2025

(65) Prior Publication Data
US 2025/0169408 A1    May 29, 2025

Related U.S. Application Data

(63) Continuation of application No. PCT/CN2024/075896, filed on Feb. 5, 2024.

(30) Foreign Application Priority Data

May 15, 2023    (CN) ......................... 202310543142.1

(51) Int. Cl.
*A01G 25/09*    (2006.01)
*A01C 23/04*    (2006.01)
*A01M 7/00*    (2006.01)

(52) U.S. Cl.
CPC .......... *A01G 25/092* (2013.01); *A01C 23/042* (2013.01); *A01C 23/047* (2013.01);
(Continued)

(58) Field of Classification Search
CPC .. A01G 25/092; A01C 23/042; A01C 23/047; A01M 7/0042; A01M 7/0085;
(Continued)

(56) References Cited

U.S. PATENT DOCUMENTS 3,598,142 A * 8/1971 Neier .................. A01G 25/092
                                                              239/731
3,648,935 A * 3/1972 Waldrum ............ A01M 7/0035
                                                               239/685

(Continued)

FOREIGN PATENT DOCUMENTS

CN    201894098 U  *  7/2011
CN    203399574 U  *  1/2014
(Continued)

OTHER PUBLICATIONS

Claims of PCT/CN2024/075896.
CNIPA (ISA), Written opinion for PCT/CN2024/075896, Apr. 15, 2024.

*Primary Examiner* — Arthur O. Hall
*Assistant Examiner* — Anna Thi Ho
(74) *Attorney, Agent, or Firm* — Hemisphere Law, PLLC; Zhigang Ma

(57) ABSTRACT

A circular sprinkler irrigation all-in-one machine capable of spraying water, fertilizer, and pesticide includes a sprinkler irrigation frame and a storage pesticide box disposed at a side of the sprinkler irrigation frame, and a top end of the sprinkler irrigation frame is fixedly connected to a lower connecting seat. The operator control the machine through a control panel to uniformly spray and irrigate crops, an area of spraying water, pesticide and fertilizer can be adjusted (Continued)

according to the area of crops, effectively saving water, fertilizer and pesticide resources, accurate fertilization or spraying pesticide can be achieved according to different crops, the integration of a water pipeline and a first electric power line with a main sprinkler irrigation pipe ensures that the spraying operation can be carried out regularly and continuously during rotary spraying, avoiding line entanglement, improving device versatility, overall spraying accuracy and the neatness of the device line.

4 Claims, 7 Drawing Sheets

(52) U.S. Cl.
CPC ........ *A01M 7/0042* (2013.01); *A01M 7/0085* (2013.01); *A01M 7/0092* (2013.01)

(58) Field of Classification Search
CPC . A01M 7/0092; A01M 7/0035; B05B 7/0093; B05B 9/007
USPC ........ 239/728, 146, 159, 147, 161, 166, 176
See application file for complete search history.

(56) References Cited

U.S. PATENT DOCUMENTS

| | | | | | |
|---|---|---|---|---|---|
| 3,653,400 | A * | 4/1972 | Coates | ................. | A01G 25/092 239/731 |
| 3,797,517 | A * | 3/1974 | Kircher | ................. | A01G 25/092 239/738 |
| 3,802,627 | A * | 4/1974 | Seckler | ................. | A01G 25/092 239/729 |
| 3,840,043 | A * | 10/1974 | Olson | ................. | A01G 25/092 239/728 |
| 4,074,783 | A * | 2/1978 | Arndt | ................. | A01G 25/092 239/731 |
| 4,186,880 | A * | 2/1980 | Jacobi | ................. | A01G 25/092 239/731 |
| 4,195,781 | A * | 4/1980 | Scholz | ................. | A01G 25/092 239/731 |
| 4,340,183 | A * | 7/1982 | Kegel | ................. | A01G 25/092 239/DIG. 1 |
| 4,356,972 | A * | 11/1982 | Vikre | ................. | A01G 25/092 239/173 |
| 4,569,481 | A * | 2/1986 | Davis | ................. | A01G 25/092 239/729 |
| 4,664,316 | A * | 5/1987 | Purtell | ................. | A01G 25/09 239/735 |
| 4,729,514 | A * | 3/1988 | Ostrom | ................. | A01C 7/004 222/630 |
| 5,366,159 | A * | 11/1994 | Childers | ................. | B05B 7/26 137/564.5 |
| 5,549,248 | A * | 8/1996 | Baker | ................. | A01C 23/042 239/251 |
| 5,678,771 | A * | 10/1997 | Chapman | ................. | A01G 25/092 239/727 |
| 5,862,997 | A * | 1/1999 | Reinke | ................. | A01G 25/092 180/343 |
| 5,907,925 | A * | 6/1999 | Guyot | ................. | A01B 79/005 47/DIG. 10 |
| 6,648,243 | B1 * | 11/2003 | Kastner | ................. | A01M 21/043 137/268 |
| 7,878,429 | B2 * | 2/2011 | Parod | ................. | A01G 25/092 239/735 |
| 7,883,035 | B2 * | 2/2011 | Coleman | ................. | B05B 1/205 239/542 |
| 9,101,097 | B2 * | 8/2015 | Malsam | ................. | A01G 25/092 |
| 9,149,012 | B1 * | 10/2015 | Sorensen | ................. | A45D 2/00 |
| 10,257,989 | B2 * | 4/2019 | Anderson | ................. | A01G 25/092 |
| 2004/0093912 | A1 * | 5/2004 | Krieger | ................. | A01G 25/092 68/19 |
| 2006/0283507 | A1 * | 12/2006 | Marcy | ................. | A01G 25/097 137/580 |
| 2007/0221763 | A1 * | 9/2007 | Sieling | ................. | A01G 25/092 239/728 |
| 2011/0017850 | A1 * | 1/2011 | Waybright | ................. | A01G 25/092 239/728 |
| 2012/0067441 | A1 * | 3/2012 | Korus | ................. | F16L 23/0286 137/561 R |
| 2014/0371971 | A1 * | 12/2014 | Welch | ................. | A01G 25/092 701/23 |
| 2015/0351334 | A1 * | 12/2015 | Abts | ................. | A01G 25/092 239/728 |
| 2016/0157445 | A1 * | 6/2016 | Mortensen | ................. | B05B 1/20 239/728 |
| 2017/0055468 | A1 * | 3/2017 | Frager | ................. | A01G 25/092 |
| 2017/0335923 | A1 * | 11/2017 | Smith | ................. | F16H 1/16 |
| 2019/0297796 | A1 * | 10/2019 | Gerdes | ................. | A01G 25/167 |
| 2019/0357519 | A1 * | 11/2019 | Castro | ................. | A01M 7/0075 |
| 2020/0404866 | A1 * | 12/2020 | Thatcher | ................. | A01G 25/02 |
| 2022/0015310 | A1 * | 1/2022 | Raj | ................. | G05D 1/689 |
| 2022/0039337 | A1 * | 2/2022 | Miller | ................. | A01G 25/16 |
| 2022/0124992 | A1 * | 4/2022 | Charling | ................. | A01G 25/16 |
| 2022/0373062 | A1 * | 11/2022 | Kastl | ................. | A01G 25/092 |
| 2023/0036580 | A1 * | 2/2023 | Sabti | ................. | B05B 7/32 |

FOREIGN PATENT DOCUMENTS

| | | | | | |
|---|---|---|---|---|---|
| CN | 203400804 | U | * | 1/2014 | |
| CN | 103583316 | A | * | 2/2014 | |
| CN | 204653509 | U | * | 9/2015 | |
| CN | 106069629 | A | | 11/2016 | |
| CN | 106359350 | B | * | 6/2019 | .......... A01M 7/0042 |
| CN | 110622670 | A | * | 12/2019 | |
| CN | 113039916 | A | * | 6/2021 | .......... A01C 23/002 |
| EP | 2377389 | A1 | * | 10/2011 | |
| KR | 20190001326 | U | * | 11/2017 | .......... A01M 7/0089 |
| KR | 102251933 | B1 | * | 5/2021 | .......... A01M 7/006 |
| WO | 2016188450 | A1 | | 12/2016 | |
| WO | WO-2021258145 | A1 | * | 12/2021 | .......... A01G 25/092 |

* cited by examiner

CIRCULAR SPRINKLER IRRIGATION ALL-IN-ONE MACHINE CAPABLE OF SPRAYING WATER, FERTILIZER AND PESTICIDE

TECHNICAL FIELD

The disclosure relates to the technical field of irrigation devices, and more particularly to a circular sprinkler irrigation all-in-one machine capable of spraying water, fertilizer and pesticide.

BACKGROUND

Irrigation machinery includes mechanical irrigation equipment such as pointer type (center pivot type), translational type, twisting (rolling) disc type, rotor type, rolling type, etc. In the disclosure, the irrigation machinery specifically refers to the pointer type (center pivot type) and translational irrigation equipment, and large-scale sprinkler irrigation equipment have the advantages of high irrigation efficiency and water conservation, and are especially suitable for large-scale agricultural planting. With the development of productivity level, the degree of intensification of agricultural production continues to increase, and the application scope of large-scale sprinkler irrigation equipment is becoming increasingly wider. The related art has disclosed various types of equipment, such as translational sprinkler irrigation machines and circular sprinkler irrigation machines. These machines generally have a traveling device, a tower and a span body, the span body is equipped with a main water pipe, a water supply device provides water for the main water pipe, and the main water pipe is connected with a sprinkler pipe for irrigation.

However, the current circular sprinkler irrigation machine performs circular sprinkler irrigation with a central pivot-type annular rotation for sprinkler irrigation, and crops usually need to be sprayed with water, fertilizer and pesticide, which requires additional water, fertilizer and pesticide spraying equipment, and the spraying equipment is cumbersome and has low usage efficiency. Alternatively, water, fertilizer and pesticide spraying pipes are directly hung at the bottom of the sprinkler irrigation machine, but the water pipeline and the electric power line cannot be seamlessly integrated with the sprinkler irrigation equipment. As a result, when the sprinkler irrigation machine rotates and sprinkles, the water pipeline and the electric power line are entangled with the sprinkler irrigation equipment, preventing the equipment from performing continuous rotational irrigation. This also prevents precise irrigation and spraying of water, fertilizer, and pesticide. Therefore, there is an urgent need for an integrated device that includes a spraying water, fertilizer and pesticide structure, where the water pipeline and electric power line are unified and integrated, allowing for precise and efficient irrigation.

SUMMARY

In order to solve the problems in the prior art, the disclosure provides a circular sprinkler irrigation all-in-one machine (also referred to as circular sprinkler irrigation device) capable of spraying water, fertilizer and pesticide.

In order to solve the above technical problems, the disclosure is implemented through the following technical solutions.

A circular sprinkler irrigation all-in-one machine capable of spraying water, fertilizer, and pesticide includes a sprinkler irrigation frame and a storage pesticide box, the storage pesticide box is disposed at a side of the sprinkler irrigation frame, a top end of the sprinkler irrigation frame is fixedly connected to a lower connecting seat, a top end of the lower connecting seat is rotatably connected to an upper connecting seat, and an inner wall of the upper connecting seat is fixedly connected to a main sprinkler irrigation pipe, a first electric power line, and a water pipeline. A bottom end of the main sprinkler irrigation pipe is fixedly connected to a fixed frame, with reinforcement rods fixedly connected to two sides of the fixed frame. A bottom end of the fixed frame is fixedly connected to a connecting frame via bolts. A bottom end of the connecting frame defines a rotating groove, an inner wall of the rotating groove is rotatably connected to a winding rod, the winding rod is fixedly connected at its axis to a winding wheel, and an outer wall of the winding wheel is wrapped with a connecting rope. A bottom end of the connecting rope is fixedly connected to a connecting ring, an inner side of the connecting ring is fixedly connected to a spray irrigation water-fertilizer-pesticide tube, and an end of the spray irrigation water-fertilizer-pesticide tube is in fluid communication with the water pipeline.

In an embodiment, a side of the connecting frame is fixedly connected to an adjusting motor, an output end of the adjusting motor is fixedly connected to a rotating shaft, an end of the rotating shaft is fixedly connected to a first gear, and an outer wall of the winding rod is fixedly connected to a second gear, with the second gear meshing with the first gear.

In an embodiment, a side of the sprinkler irrigation frame is fixedly connected to a control panel, and a side of the sprinkler irrigation frame is fixedly connected to a controller. A bottom end of an inner wall of the sprinkler irrigation frame is fixedly connected to an input sprinkler irrigation pipe, an end of the input sprinkler irrigation pipe is fixedly connected to a connection water pipe, a top end of the input sprinkler irrigation pipe is fixedly connected to the lower connecting seat, the control panel is electrically connected to the controller, and a top end of the control panel is electrically connected to a second electric power line.

In an embodiment, a top end of the storage pesticide box is fixedly connected to a water pump, an output end of the water pump is fixedly connected to an output pipe, the output pipe is fixedly connected to an output water pipe, an end of the output water pipe is fixedly connected to the lower connecting seat, an interior of the lower connecting seat is provided with a second connection sealing groove, an inner wall of the second connection sealing groove is rotatably connected to a sealing connection head, and a top end of the sealing connection head is fixedly connected to the main sprinkler irrigation pipe.

In an embodiment, an inner wall of the lower connecting seat defines a first connection sealing groove, an inner wall of the first connection sealing groove is slidably connected to a first sealing connection seat, a top end of the first sealing connection seat is fixedly connected to the water pipeline, a bottom end of the lower connecting seat defines an installation groove, an inner wall of the installation groove is fixedly connected to a lower connecting block, a top end of the lower connecting block is fixedly connected to a lower electrical connection seat, a bottom end of the lower connecting block is fixedly connected to the second electric power line, a bottom end of the inner wall of the upper connecting seat is fixedly connected to an upper connecting block, an interior of the upper connecting block is fixedly connected to an upper electrical connection head, the upper electrical connection head is slidably connected to the lower electrical connection seat, and the top end of the upper electrical connection head is fixedly connected to the first electric power line.

In an embodiment, a top end of the storage pesticide box is fixedly connected to a pesticide bucket, the top end of the storage pesticide box is rotatably connected to a stirring rod, an input end of the water pump is fixedly connected to a second bevel gear, the second bevel gear is connected to the inner wall of the storage pesticide box, the top end of the stirring rod is fixedly connected to a dispersion plate, the output end of the water pump is fixedly connected to a main shaft, and the axis of the main shaft is fixedly connected to a first bevel gear, which meshes with the dispersion plate. The outer wall of the bottom end of the stirring rod is fixedly connected to a stirring plate.

In an embodiment, a side of the storage pesticide box is fixedly connected to a stirring box, a side of the stirring box is fixedly connected to an inclined plate, a bottom end of the inclined plate is fixedly connected to an input pipe, an output pipe of the pesticide bucket is located at the top end of the input pipe, a side of the stirring box is provided with an overflow groove, a side of the stirring box is provided with holes, the number of which is set to multiple, a side of the storage pesticide box is fixedly connected to an input water pipe, and the interior of the input water pipe is fixedly connected to a second solenoid valve.

In an embodiment, a bottom side of the main sprinkler irrigation pipe is fixedly connected to a movement mechanism, a bottom end of the movement mechanism is rotatably connected to a roller through a bearing, a side of the movement mechanism is fixedly connected to a drive motor, an output end of the drive motor is fixedly connected to the axis of the roller, the drive motor is electrically connected to the control panel via the first electric power line, two sides of the main sprinkler irrigation pipe are fixedly connected to sprinkler irrigation pipes, and the bottom end of each sprinkler irrigation pipe is fixedly connected to a first solenoid valve. The bottom end of each first solenoid valve is fixedly connected to a sprinkler irrigation nozzle, and each first solenoid valve is electrically connected to the control panel via the first electric power line. A water-fertilizer-pesticide electromagnetic nozzle is electrically connected to the control panel via the first electric power line.

In an embodiment, a side of the main sprinkler irrigation pipe is fixedly connected to a limiting frame. The inner groove of the limiting frame is provided with a limiting sliding groove, and the inner wall of the limiting sliding groove is fixedly connected to an elastic member. The inner wall of the limiting sliding groove is slidably connected to a limiting block, with a side of the limiting block being fixedly connected to an end of the elastic member. The first electric power line is located within the inner groove of the limiting frame. The beneficial effects of the disclosure are as follows.

The operator can control the device through the control panel. The drive motor drives the roller, which in turn rotates the main sprinkler irrigation pipe in a circular motion around the sprinkler irrigation frame. By controlling the opening of the first solenoid valve, water is evenly sprayed for irrigation of crops. When there is a need to apply water, fertilizer, and pesticide, concentrated water, fertilizer, and pesticide are prepared and then sprayed through the water-fertilizer-pesticide electromagnetic nozzle. This enables pest control or fertilization treatment for crops. The area for spraying irrigation and applying water, fertilizer, and pesticide can be adjusted according to the area of the crops, which effectively saves water and fertilizer resources, ensuring precise spraying. The height of the spray irrigation water-fertilizer-pesticide tube and the water-fertilizer-pesticide electromagnetic nozzle from crops can be adjusted by controlling the adjusting motor, allowing for precise fertilization or pesticide application depending on the type of crops. The integration of the water pipeline and first electric power line with the main sprinkler irrigation pipe ensures that the spraying operation can be carried out regularly and continuously during rotary spraying, avoiding line entanglement, improving the versatility of the device, and improving the overall spraying accuracy and the neatness of the device line.

BRIEF DESCRIPTION OF DRAWINGS

In FIGS. 1 to 8: 1. sprinkler irrigation frame; 2. storage pesticide box; 3. lower connecting seat; 4. upper connecting seat; 5. main sprinkler irrigation pipe; 6. first electric power line; 7. water pipeline; 8. movement mechanism; 9. spray irrigation water-fertilizer-pesticide tube; 10. control panel; 11. controller; 12. input sprinkler irrigation pipe; 13. connection water pipe; 14. sprinkler irrigation pipe; 15. first solenoid valve; 16. pesticide bucket; 17. input water pipe; 18. second solenoid valve; 19. water pump; 20. output water pipe; 21. limiting frame; 22. fixed frame; 23. sprinkler irrigation nozzle; 24. connecting frame; 25. rotating groove; 26. adjusting motor; 27. winding rod; 28. winding wheel; 29. connecting rope; 30. water-fertilizer-pesticide electromagnetic nozzle; 31. connecting ring; 32. drive motor; 33. roller; 34. reinforcement rod; 35. stirring rod; 36. inclined plate; 37. dispersion plate; 38. main shaft; 39. first bevel gear; 40. second bevel gear; 41. output pipe; 42. input pipe; 43. stirring plate; 44. hole; 45. overflow groove; 46. second electric power line; 47. first connection sealing groove; 48. first sealing connection seat; 49. second connection sealing groove; 50. sealing connection head; 51. installation groove; 52. lower connecting block; 53. lower electrical connection seat; 54. upper electrical connection head; 55. upper connecting block; 56. elastic member; 57. rotating shaft; 58. first gear; 59. second gear; 60. limiting sliding groove; 61. limiting block; 62. stirring box.

DETAILED DESCRIPTION OF EMBODIMENTS

Figure 1:
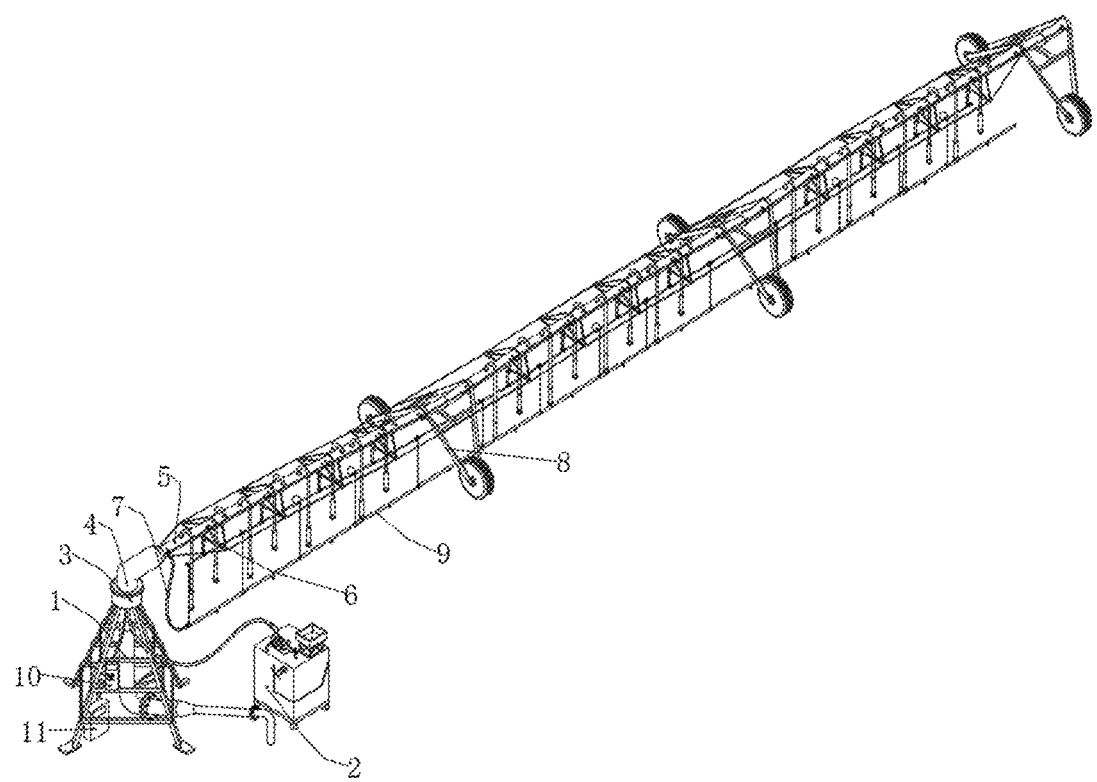
FIG. 1 is a schematic diagram of an overall structure of a circular sprinkler irrigation all-in-one machine in the disclosure.
Figure 2:
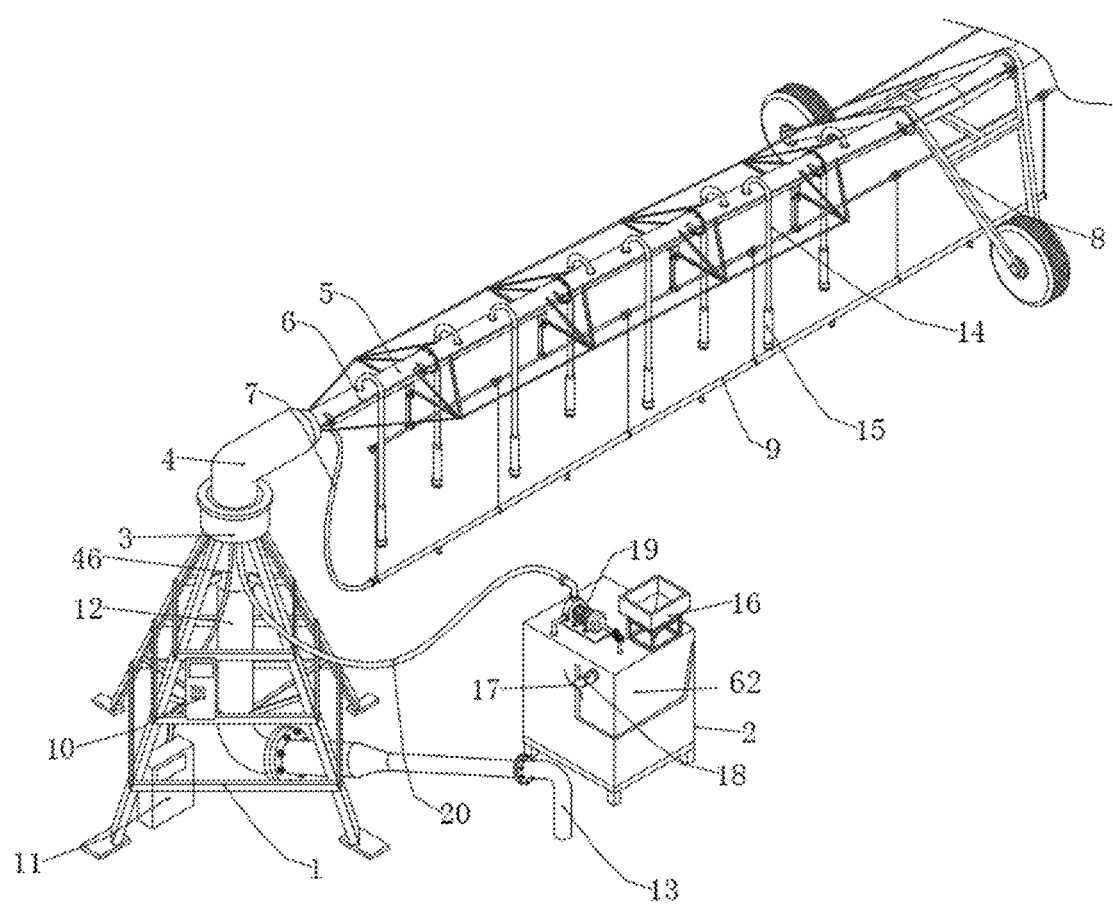
FIG. 2 is a partial schematic diagram of the structure shown in FIG. 1 of the disclosure.

The following will describe the technical solutions of the embodiments of the disclosure in conjunction with the accompanying drawings. Apparently, the described embodiments are only part of the embodiments of the disclosure, rather than all the embodiments. All other embodiments that can be derived by those skilled in the art without making any inventive efforts based on the embodiments of the disclosure fall within the scope of protection of the disclosure.

Embodiment 1

As shown in FIG. 1 to FIG. 8, a circular sprinkler irrigation all-in-one machine capable of spraying water, fertilizer, and pesticide includes a sprinkler irrigation frame 1 and a storage pesticide box 2. The storage pesticide box 2 is disposed at a side of the sprinkler irrigation frame 1. The top end of the sprinkler irrigation frame 1 is fixedly connected to a lower connecting seat 3. The top end of the lower connecting seat 3 is rotatably connected to an upper connecting seat 4. The inner wall of the upper connecting seat 4 is fixedly connected to a main sprinkler irrigation pipe 5. The inner wall of the upper connecting seat 4 is also fixedly connected to a first electric power line 6, and a water pipeline 7. The bottom end of the main sprinkler irrigation pipe 5 is fixedly connected to a fixed frame 22. The two sides of the fixed frame 22 are fixedly connected to reinforcement rods 34, respectively. The bottom end of the fixed frame 22 is fixedly connected to connecting frames 24 via bolts. The bottom end of each connecting frame 24 is provided with a rotating groove 25, and a winding rod 27 is rotatably connected to the rotating grooves 25 of the multiple connecting frames 24. The central axis of the winding rod 27 is fixedly connected to winding wheels 28. The outer wall of each winding wheel 28 is wound with a connecting rope 29. The bottom end of each connecting rope 29 is fixedly connected to a connecting ring 31. The inner sides of the connecting rings 31 are fixedly connected to a spray irrigation water-fertilizer-pesticide tube 9. An end of the spray irrigation water-fertilizer-pesticide tube 9 is connected to the water pipeline 7. During use, a drive motor 32 is controlled via a control panel 10, which further drives a roller 33 to rotate and cause the main sprinkler irrigation pipe 5 to perform a circular motion around the sprinkler irrigation frame 1. At the same time, a first solenoid valve 15 is controlled via the control panel 10 to open, so as to spray the sprinkler irrigation water via the input sprinkler irrigation pipe 12, the lower connecting seat 3, the upper connecting seat 4, the main sprinkler irrigation pipe 5, the sprinkler irrigation pipe 14, and the sprinkler irrigation nozzle 23 to irrigate crops evenly. When it is necessary to apply water, fertilizer, and pesticide, concentrated fertilizer and pesticide are fed into a pesticide bucket 16 and flows into a stirring box 62. Meanwhile, the control panel 10 controls a second solenoid valve 18 to manage the flow of input water into the stirring box 62, the concentrated fertilizer and pesticide drip onto the inner wall of the stirring box 62, while external water flows into the stirring box 62. The water pump 19 operates, driving a main shaft 38, a first bevel gear 39, and a second bevel gear 40 to rotate the stirring rod 35 and the stirring plate 43, thereby mixing the water, fertilizer, and pesticide to obtain mixed solution. The mixed solution flows into the inner wall of the storage pesticide box 2 via an overflow groove 45 and is transported by the water pump 19 into an output water pipe 20. It is then sprayed onto crops via the lower connecting seat 3, the upper connecting seat 4, the water pipeline 7, the spray irrigation water-fertilizer-pesticide tube 9 and the water-fertilizer-pesticide electromagnetic nozzle 30, and the crops are sprayed with the mixture of water, fertilizer and pesticide, treated with pest control or fertilizer increase. The control panel 10 controls the water-fertilizer-pesticide electromagnetic nozzle 30 and the first electromagnetic valve 15, so as to adjust the area of sprinkler irrigation and pesticide and fertilizer spraying according to the area of crops, effectively save water, and fertilizer and pesticide resources, and carry out accurate spraying. The adjusting motor 26 is also controlled via the control panel 10 to operate, further driving the rotating shaft 57, the first gear 58, and the second gear 59 to rotate the winding rod 27 and the winding wheel 28, thereby winding or releasing the connecting rope 29, which adjusts the heights of the spray irrigation water-fertilizer-pesticide tube 9 and the water-fertilizer-pesticide electromagnetic nozzle 30 relative to the crops, facilitating precise fertilization or pesticide spraying for different crops. Additionally, the water pipeline 7 and the first electric power line 6 are integrated with the main sprinkler irrigation pipe 5, so that during the rotary spraying, the spraying operation can be carried out regularly and continuously, avoiding the line winding, improving the versatility of the device and improving the spraying accuracy of the whole device and the neatness of the device line.

Embodiment 2

As shown in FIG. 3 to FIG. 8, a side of the connecting frame 24 is fixedly connected to an adjusting motor 26, the output end of the adjusting motor 26 is fixedly connected to a rotating shaft 57, and an end of the rotating shaft 57 is fixedly connected to a first gear 58. The outer wall of the winding rod 27 is fixedly connected to a second gear 59, which is meshed with the first gear 58. A side of the sprinkler irrigation frame 1 is fixedly connected to a control panel 10, and another side of the sprinkler irrigation frame 1 is fixedly connected to a controller 11. The inner wall at the bottom end of the sprinkler irrigation frame 1 is fixedly connected to an input sprinkler irrigation pipe 12. The end of the input sprinkler irrigation pipe 12 is fixedly connected to a connection water pipe 13, and the top end of the input sprinkler irrigation pipe 12 is fixedly connected to the lower connecting seat 3. The control panel 10 and the controller 11 are electrically connected. The top end of the control panel 10 is electrically connected to a second electric power line 46. The top end of the storage pesticide box 2 is fixedly connected to a water pump 19. The output end of the water pump 19 is fixedly connected to an output pipe 41, which is fixedly connected to the output water pipe 20. An end of the output water pipe 20 is fixedly connected to the lower connecting seat 3. The lower connecting seat 3 is provided with a second connection sealing groove 49 therein. The inner wall of the second connection sealing groove 49 is rotatably connected to a sealing connection head 50. The top end of the sealing connection head 50 is fixedly connected to the main sprinkler irrigation pipe 5. When the lower connecting seat 3 is connected to the upper connecting seat 4, the sealing connection head 50 rotates within the second connection sealing groove 49, thereby connecting the main sprinkler irrigation pipe 5 and the input sprinkler irrigation pipe 12 to allow the flow of the sprinkler irrigation water. At the same time, the first sealing connection seat 48 is rotatably connected within the first connection sealing groove 47, enabling the connection of the output water pipe 20 and the water pipeline 7, allowing the flow of water, fertilizer, and pesticide. The upper electrical connection head 54 is rotatably electrically connected to the lower electrical connection seat 53, thereby electrically connecting the first electric power line 6 and the second electric power line 46. This arrangement further standardizes the sprinkler irrigation pipe, water, fertilizer and medicine pipes and electric power lines to improve the fluency and cleanliness of device operation.

Embodiment 3

Figure 3:
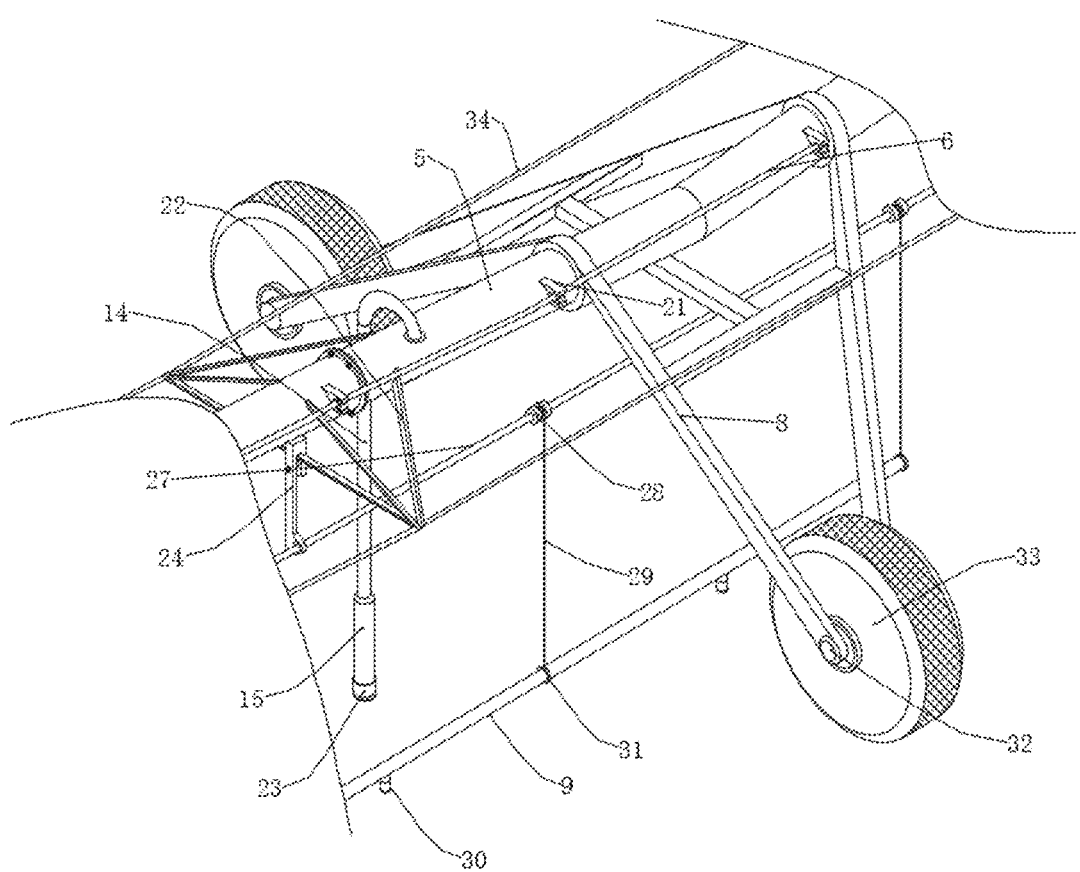
FIG. 3 is a partial schematic diagram of the structure shown in FIG. 2 of the disclosure.
Figure 4:
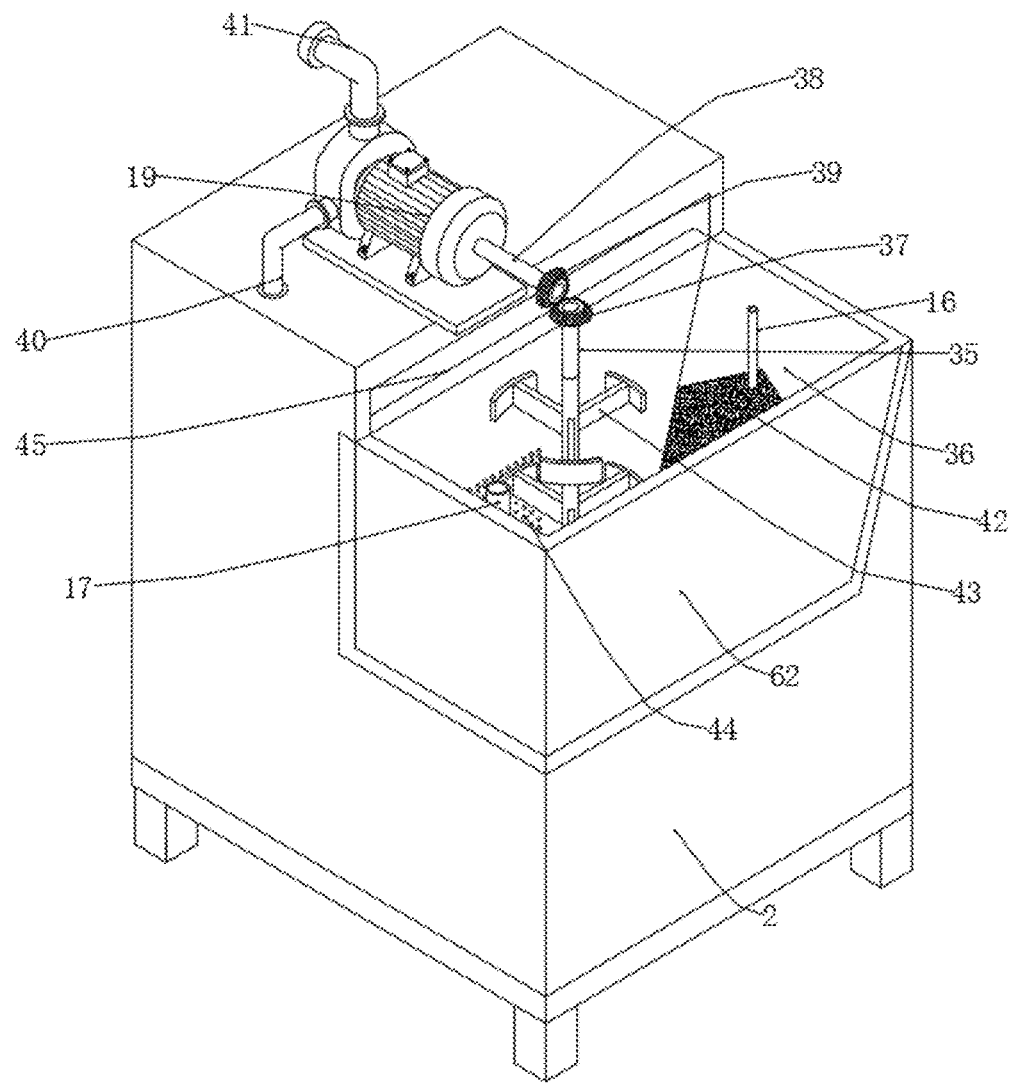
FIG. 4 is a structural schematic diagram of a storage pesticide box in the disclosure.
Figure 5:
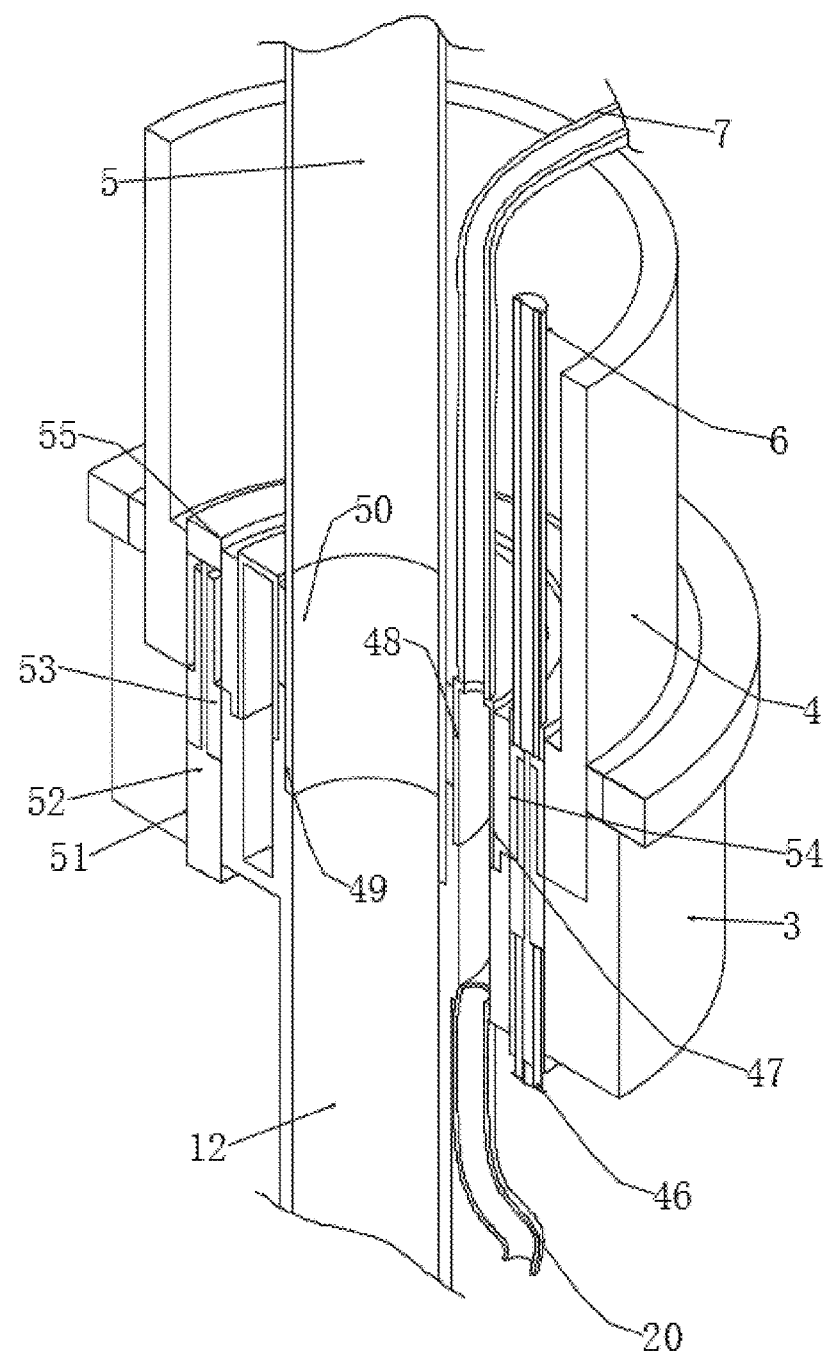
FIG. 5 is a schematic diagram of a connection structure between a lower connecting seat and an upper connecting seat of the disclosure.
Figure 6:
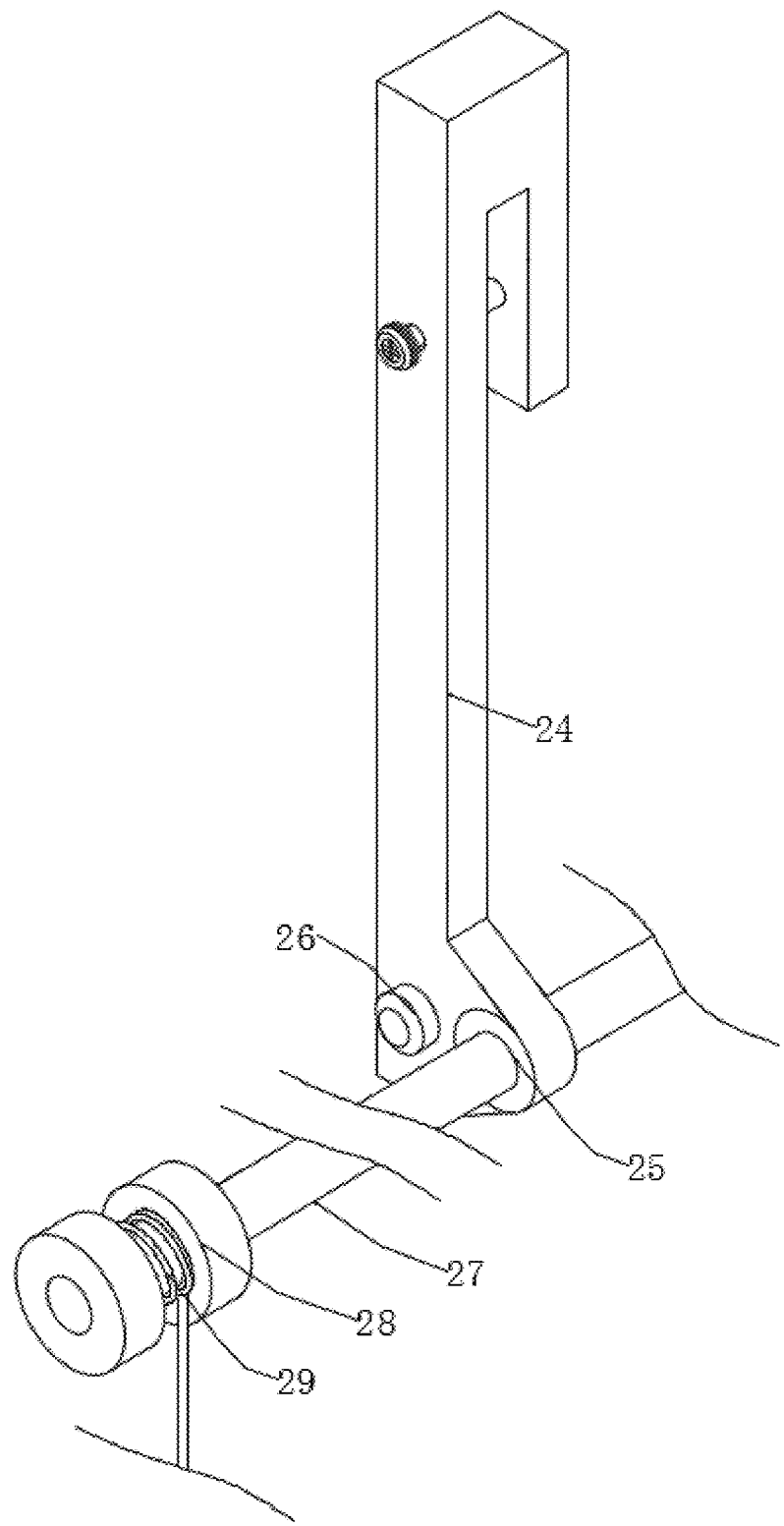
FIG. 6 is a structural schematic diagram of a fixed frame in the disclosure.
Figure 7:
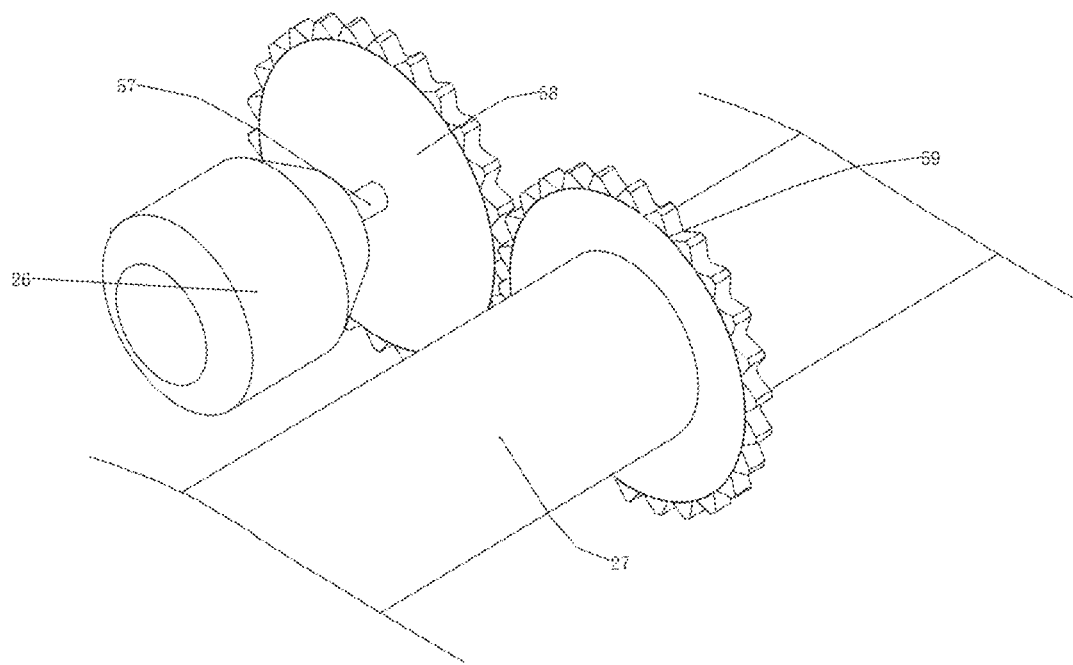
FIG. 7 is a structural schematic diagram of an adjusting motor in the disclosure.
Figure 8:
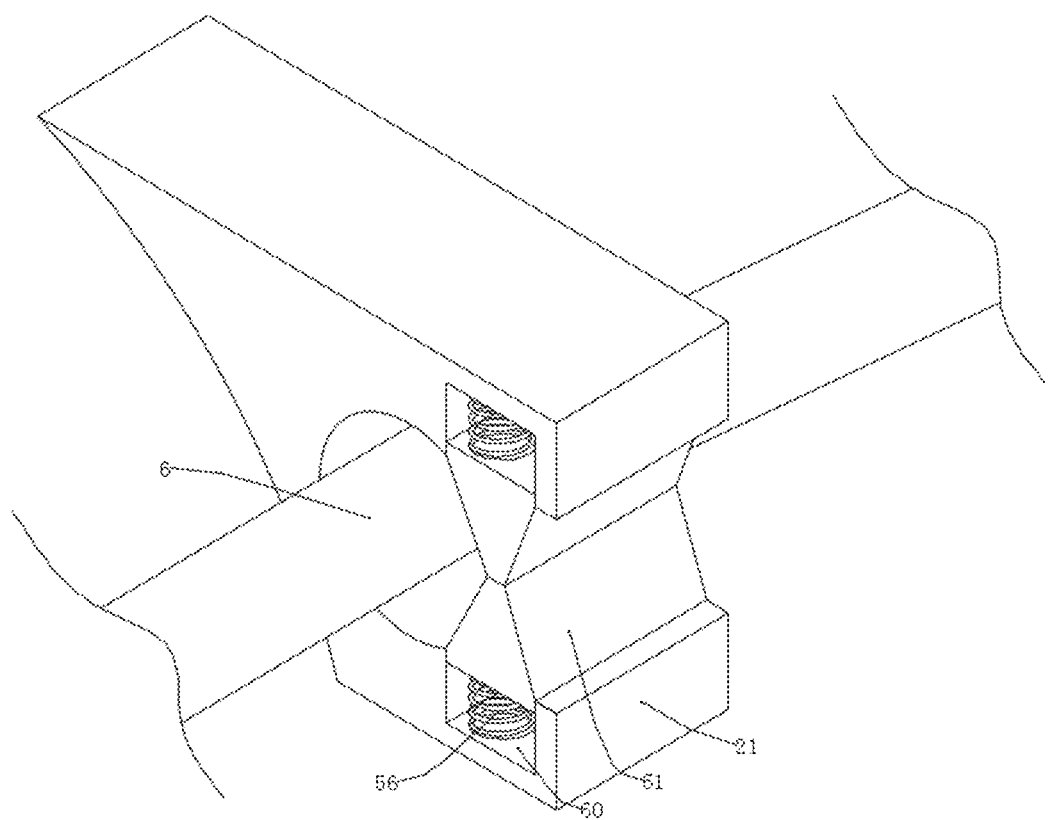
FIG. 8 is a schematic diagram of an internal structure of a limiting frame in the disclosure.

As shown in FIG. 3 to FIG. 4, the inner wall of the lower connecting seat 3 is provided with a first connection sealing groove 47. The inner wall of the first connection sealing groove 47 is slidably connected to a first sealing connection seat 48, and the top of the first sealing connection seat 48 is fixedly connected to the water pipeline 7. The bottom end of the lower connecting seat 3 is provided with an installation groove 51, and the inner wall of the installation groove 51 is fixedly connected to a lower connecting block 52. The top end of the lower connecting block 52 is fixedly connected to a lower electrical connection seat 53, and the bottom end of the lower connecting block 52 is fixedly connected to the second electric power line 46. The bottom end of the inner wall of the upper connecting seat 4 is fixedly connected to an upper connecting block 55. The interior of the upper connecting block 55 is fixedly connected to an upper electrical connection head 54, which slidably connected to the lower electrical connection seat 53. The top end of the upper electrical connection head 54 is fixedly connected to the first electric power line 6. The top end of the storage pesticide box 2 is fixedly connected to a pesticide bucket 16. The top end of the storage pesticide box 2 is rotatably connected to a stirring rod 35. The input end of the water pump 19 is fixedly connected to a second bevel gear 40, which is connected to the inner wall of the storage pesticide box 2, ensuring communication between the two. The top end of the stirring rod 35 is fixedly connected to a dispersion plate 37. The output end of the water pump 19 is fixedly connected to a main shaft 38. The axis of the main shaft 38 is fixedly connected to a first bevel gear 39, which meshes with the dispersion plate 37. The outer wall of the bottom end of the stirring rod 35 is fixedly connected to a stirring plate 43. The concentrated pesticide drops onto the dispersion plate 37, where it is dispersed and flows downward, facilitating mixing with tap water. Simultaneously, the movement of the stirring plate 43 promotes further mixing of the concentrated pesticide with the tap water. Finally, the mixture flows through the overflow groove 45 into the interior of the storage pesticide box 2 for further mixing, while the remaining mixed pesticide in the stirring box 62 drips through the holes 44 into the interior of the storage pesticide box 2.

Embodiment 4

As shown in FIG. 3 to FIG. 8, a side of the storage pesticide box 2 is fixedly connected to a stirring box 62. A side of the stirring box 62 is fixedly connected to an inclined plate 36, and the bottom end of the inclined plate 36 is fixedly connected to an input pipe 42. The output pipe of the pesticide bucket 16 is positioned at the top end of the input pipe 42. A side of the stirring box 62 is provided with an overflow groove 45, and another side of the stirring box 62 is provided with holes 44. The number of the holes 44 is set to be multiple. A side of the storage pesticide box 2 is fixedly connected to an input water pipe 17, and the interior of the input water pipe 17 is fixedly connected to a second solenoid valve 18. The bottom side of the main sprinkler irrigation pipe 5 is fixedly connected to a movement mechanism 8. The bottom end of the movement mechanism 8 is rotatably connected to rollers 33 via bearings. A side of the movement mechanism 8 is fixedly connected to drive motors 32. The output end of the drive motor 32 is fixedly connected to the axis of the corresponding roller 33. The drive motor 32 is electrically connected to the control panel 10 through the first electric power line 6. Two sides of the main sprinkler irrigation pipe 5 are fixedly connected to sprinkler irrigation pipes 14. The bottom end of each sprinkler irrigation pipe 14 is fixedly connected to a first solenoid valve 15, and the bottom end of each first solenoid valve 15 is fixedly connected to a sprinkler irrigation nozzle 23. The first solenoid valve 15 is electrically connected to the control panel 10 through the first electric power line 6. The water-fertilizer-pesticide electromagnetic nozzle 30 is electrically connected to the control panel 10 via the first electric power line 6. A side of the main sprinkler irrigation pipe 5 is fixedly connected to a limiting frame 21. The inner groove of the limiting frame 21 is provided with a limiting sliding groove 60, and the inner wall of the limiting sliding groove 60 is fixedly connected to an elastic member 56. The inner wall of the limiting sliding groove 60 is slidably connected to a limiting block 61. A side of the limiting block 61 is fixedly connected to an end of the elastic member 56. The first electric power line 6 is positioned in the inner groove of the limiting frame 21. When the first electric power line 6 is fixed, it is pushed into the inner groove of the limiting frame 21. Under the action of the elastic member 56, the limiting block 61 is pushed to position the first electric power line 6, which also facilitates the disassembly and arrangement of the first electric power line 6.

Based on the above, the working principle of the disclosure is as follows: during operation of the circular sprinkler irrigation all-in-one machine, the operator controls the drive motor 32 via the control panel 10, which then drives the rollers 33 to rotate, causing the main sprinkler irrigation pipe 5 to perform a circular motion around the sprinkler irrigation frame 1. At the same time, the operator controls the opening of the first solenoid valves 15 via the control panel 10, allowing the sprinkler irrigation water to flow through the input sprinkler irrigation pipe 12, the lower connecting seat 3, the upper connecting seat 4, the main sprinkler irrigation pipe 5, the sprinkler irrigation pipes 14, and the sprinkler irrigation nozzles 23 to uniformly spray and irrigate the crops. When it is necessary to apply water, fertilizer, and pesticide, concentrated fertilizer and pesticide are introduced into the stirring box 62 via the pesticide bucket 16. At the same time, the control panel 10 controls the second solenoid valve 18 to regulate the flow of water into the stirring box 62. The concentrated fertilizer and pesticide drop onto the inner wall of the stirring box 62, and external water flows into the stirring box 62. At this time, the water pump 19 operates, driving the stirring rod 35 and the stirring plate 43 to rotate via the main shaft 38, the first bevel gear 39, and the second bevel gear 40, mixing the water, fertilizer and pesticide to obtain the mixed pesticide. The mixed pesticide flows through the overflow groove 45 and into the inner wall of the storage pesticide box 2, and is then transported via the water pump 19 to the output water pipe 20. From there, it flows through the lower connecting seat 3, the upper connecting seat 4, the water pipeline 7, and the spray irrigation water-fertilizer-pesticide tube 9, and is sprayed out by the water-fertilizer-pesticide electromagnetic nozzle 30 to spray the crops, applying water, fertilizer, and pesticide for pest control or fertilization. The control panel 10 controls the water-fertilizer-pesticide electromagnetic nozzle 30 and the first electromagnetic valve 15, thus the control panel 10 can adjust the areas for sprinkler irrigation and pesticide and fertilizer spraying according to the crop area, effectively saving water, fertilizer, and pesticide resources and enabling precise spraying. Meanwhile, the adjusting motor 26 operates, driving the winding rod 27 and the winding wheel 28 through the rotating shaft 57, the first gear 58, and the second gear 59 to wind or unwind the connecting rope 29. This adjustment regulates the heights of the spray irrigation water-fertilizer-pesticide tube 9 and the water-fertilizer-pesticide electromagnetic nozzle 30 relative to the crops, facilitating precise fertilization or pesticide spraying for different crops. Additionally, the water pipeline 7 and the first electric power line 6 are integrated with the main sprinkler irrigation pipe 5, during the rotary spraying process, this ensures that the spraying operation can be carried out regularly and continuously, avoiding line entanglement, improving the versatility of the device, the overall spraying accuracy and the neatness of the device line. This completes the overall working process of the machine.

Although the embodiments of the disclosure have been shown and described, it will be understood by those skilled in the art that various modifications, alterations, substitutions, and variations may be made to these embodiments without departing from the principles and spirit of the disclosure. The scope of the disclosure is defined by the appended claims and their equivalents.

What is claimed is:

1. A circular sprinkler irrigation all-in-one machine capable of spraying water, fertilizer, and pesticide, comprising:
   a sprinkler irrigation frame (1);
   a storage pesticide box (2), disposed at a side of the sprinkler irrigation frame (1);
   a lower connecting seat (3), fixedly connected to a top end of the sprinkler irrigation frame (1); wherein an inner wall of the lower connecting seat (3) defines a first connection sealing groove (47);
   an upper connecting seat (4), rotatably connected to a top end of the lower connecting seat (3);
   a main sprinkler irrigation pipe (5), fixedly connected to an inner wall of the upper connecting seat (4);
   a first electric power line (6), fixedly connected to the inner wall of the upper connecting seat (4);
   a water pipeline (7), fixedly connected to the inner wall of the upper connecting seat (4);
   a fixed frame (22), fixedly connected to a bottom end of the main sprinkler irrigation pipe (5);
   a plurality of reinforcement rods (34), fixedly connected to two sides of the fixed frame (22);
   a connecting frame (24), fixedly connected to a bottom end of the fixed frame (22) via at least one bolt; wherein a bottom end of the connecting frame (24) defines a rotating groove (25);
   a winding rod (27), rotatably connected to an inner wall of the connecting frame (24) surrounding the rotating groove (25);
   a winding wheel (28), fixedly connected to an axis of the winding rod (27);
   a connecting rope (29), wound on an outer wall of the winding wheel (28);
   a connecting ring (31), fixedly connected to a bottom end of the connecting rope (29);
   a spray irrigation water-fertilizer-pesticide tube (9), fixedly connected to an inner side of the connecting ring (31); wherein an end of the spray irrigation water-fertilizer-pesticide tube (9) is connected with the water pipeline (7);
   an adjusting motor (26), fixedly connected to a side of the connecting frame (24);
   a rotating shaft (57), fixedly connected to an output end of the adjusting motor (26);
   a first gear (58), fixedly connected to an end of the rotating shaft (57);
   a second gear (59), fixedly connected to an outer wall of the winding rod (27), wherein the second gear (59) meshes with the first gear (58);
   a control panel (10), fixedly connected to a side of the sprinkler irrigation frame (1);
   a controller (11), fixedly connected to another side of the sprinkler irrigation frame (1);
   an input sprinkler irrigation pipe (12), fixedly connected to a bottom end of an inner wall of the sprinkler irrigation frame (1);
   a connection water pipe (13), fixedly connected to an end of the input sprinkler irrigation pipe (12); wherein a top end of the input sprinkler irrigation pipe (12) is fixedly connected to the lower connecting seat (3), and the control panel (10) is electrically connected to the controller (11);
   a second electric power line (46), electrically connected to a top end of the control panel (10);
   a water pump (19), fixedly connected to a top end of the storage pesticide box (2);
   an output pipe (41), fixedly connected to an output end of the water pump (19);
   an output water pipe (20), fixedly connected to the output pipe (41); wherein an end of the output water pipe (20) is fixedly connected to the lower connecting seat (3), and the lower connecting seat (3) is provided with a second connection sealing groove (49) therein;
   a sealing connection head (50), rotatably connected to an inner wall of the second connection sealing groove (49); wherein a top end of the sealing connection head (50) is fixedly connected to the main sprinkler irrigation pipe (5);
   a first sealing connection seat (48), slidably connected to an inner wall of the first connection sealing groove (47); wherein a top end of the first sealing connection seat (48) is fixedly connected to the water pipeline (7), and a bottom end of the lower connecting seat (3) defines an installation groove (51);
   a lower connecting block (52), fixedly connected to an inner wall of the installation groove (51);
   a lower electrical connection seat (53), fixedly connected to a top end of the lower connecting block (52); wherein a bottom end of the lower connecting block (52) is fixedly connected to the second electric power line (46);
   an upper connecting block (55), fixedly connected to an inner wall at a bottom end of the upper connecting seat (4);
   an upper electrical connection head (54), fixedly connected to an interior of the upper connecting block (55); wherein the upper electrical connection head (54) is slidably connected to the lower electrical connection seat (53), and a top end of the upper electrical connection head (54) is fixedly connected to the first electric power line (6);
   a pesticide bucket (16), fixedly connected to a top end of the storage pesticide box (2);
   a stirring rod (35), rotatably connected to the top end of the storage pesticide box (2);
   a dispersion plate (37), fixedly connected to a top end of the stirring rod (35);
   a main shaft (38), fixedly connected to the output end of the water pump (19);
   a first bevel gear (39), fixedly connected to an axis of the main shaft (38); wherein the first bevel gear (39) is meshed with the dispersion plate (37);

a second bevel gear (40), fixedly connected to an input end of the water pump (19); wherein the second bevel gear (40) is connected with the inner wall of the storage pesticide box (2); and a stirring plate (43), fixedly connected to an outer wall of a bottom end of the stirring rod (35).

2. The circular sprinkler irrigation all-in-one machine according to claim 1, further comprising:

a stirring box (62), fixedly connected to a side of the storage pesticide box (2);

an inclined plate (36), fixedly connected to a side of the stirring box (62);

an input pipe (42), fixedly connected to a bottom end of the inclined plate (36); wherein an output pipe of the pesticide bucket (16) is located at a top end of the input pipe (42), a side of the stirring box (62) is provided with an overflow groove (45), and a side of the stirring box (62) defines multiple holes (44); and an input water pipe (17), fixedly connected to a side of the storage pesticide box (2).

3. The circular sprinkler irrigation all-in-one machine according to claim 2, further comprising:

a movement mechanism (8), fixedly connected to a bottom side of the main sprinkler irrigation pipe (5); wherein a bottom end of the movement mechanism (8) is rotatably connected to a roller (33) through a bearing;

a drive motor (32), fixedly connected to a side of the movement mechanism (8); wherein an output end of the drive motor (32) is fixedly connected to an axis of the roller (33), the drive motor (32) is electrically connected to the control panel (10) through the first electric power line (6);

a plurality of sprinkler irrigation pipelines (14), fixedly connected to two sides of the main sprinkler irrigation pipe (5);

a plurality of first solenoid valves (15), fixedly connected to bottom ends of the plurality of sprinkler irrigation pipelines (14), respectively;

a second solenoid valve (18), fixedly connected to an interior of the input water pipe (17);

a plurality of sprinkler irrigation nozzles (23), fixedly connected to bottom ends of the plurality of first solenoid valves (15), respectively; wherein the plurality of first solenoid valves (15) are electrically connected to the control panel (10) through the first electric power line (6); and a water-fertilizer-pesticide electromagnetic nozzle (30), electrically connected to the control panel (10) through the first electric power line (6).

4. The circular sprinkler irrigation all-in-one machine according to claim 3, further comprising:

a limiting frame (21), fixedly connected to a side of the main sprinkler irrigation pipe (5); wherein an inner groove of the limiting frame (21) is provided with a limiting sliding groove (60);

an elastic member (56), fixedly connected to an inner wall of the limiting sliding groove (60); and a limiting block (61), slidably connected to the inner wall of the limiting sliding groove (60); wherein a side of the limiting block (61) is fixedly connected to an end of the elastic member (56), and the first electric power line (6) is located within the inner groove of the limiting frame (21).

* * * * *